United States Patent Office 3,450,705
Patented June 17, 1969

---

3,450,705
1a- AND/OR 7-SUBSTITUTED DERIVATIVES OF MITOMYCIN
Masanao Matsui, Yasuhiro Yamada, Tadashi Hirata, and Shigetoshi Wakaki, Tokyo, Japan, assignors to Kyowa Hakko Kogyo Co., Ltd., Tokyo, Japan, a corporation of Japan
Filed July 9, 1965, Ser. No. 470,849
Claims priority, application Japan, July 9, 1964, 39/38,195
Int. Cl. C07d 57/00; A61k 21/00
U.S. Cl. 260—295
8 Claims

ABSTRACT OF THE DISCLOSURE

Compounds of the formula

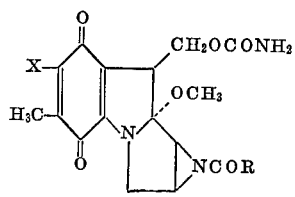

Figure 1:
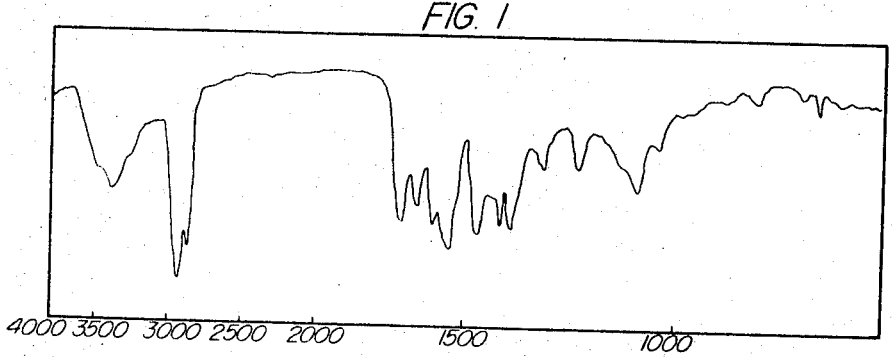

wherein X is amino, lower alkylamino, phenylamino or pyridyl and COR is halo (lower) alkanoyl, halobenzoyl, nitrobenzoyl, alkenoyl, acetylglycyl, sorbyl or acetylmethionyl and, when X is other than amino, COR is lower alkanoyl or benzoyl.

---

The present invention relates to new antibiotics, more particularly to new derivatives of mitosane compounds.

In 1956, Hata et al. isolated new antibiotics from the fermented broth of *Streptomyces caespitosus* and named the antibiotics mitomycin A and B. In 1958, Wakaki et al. isolated a third antibiotic from the same broth and named it mitomycin C. Since then it has been determined that the chemical composition of the three compounds is as follows:

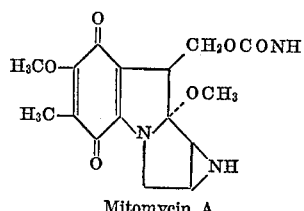

Mitomycin A

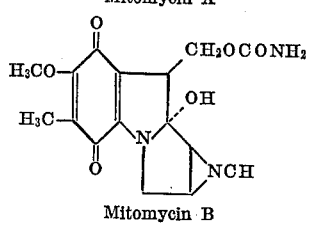

Mitomycin B

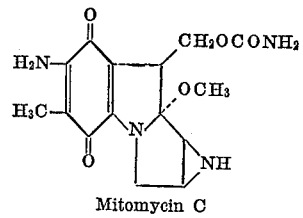

Mitomycin C

Generically, these compounds correspond to the formula

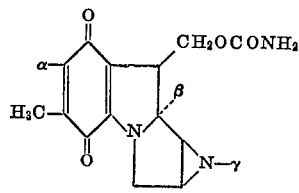

wherein:

|  | A | B | C |
|---|---|---|---|
| α is | OCH₃ | OCH₃ | NH₂ |
| β is | OCH₃ | OH | OCH₃ |
| γ is | H | CH₃ | H |

These compounds thus have the following skeleton:

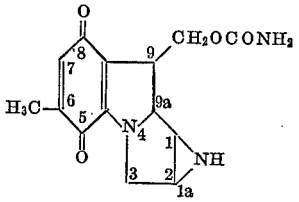

and are called mitosane compounds.

Mitomycin A, B and C are excellent antibiotics, but they have a defect in that they are toxic to human blood. In order to obtain less toxic mitosane compounds, some research has been conducted even before the determination of the chemical composition of mitomycin A, B and C; for example, monomethyl-mitomycin C or porfiromycin was synthesized by reacting mitomycin C and methyl iodide in the presence of potassium carbonate. After the determination of the chemical composition of mitomycin A, B and C, research to obtain derivatives has been actively conducted. For example, Belgian patent 624,559 provides some 6,7 and 1a-substituted derivatives of mitosane compounds.

The present invention is concerned with novel mitosane derivatives of reduced toxicity and of correspondingly enhanced utility as antibiotics, and to the preparation thereof.

The new antibiotics of the present invention are expressed by the following general formula:

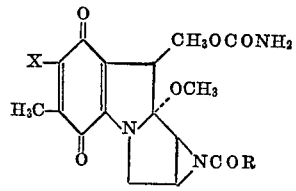

(I)

wherein X is —OCH₃ or amino, aliphatically mono- or di-substituted amino (e.g. lower alkylamino such as methylamino, ethylamino, propylamino, isopropylamino, n-butylamino, etc. or di(lower) alkylamino such as diethylamino, dipropylamino, diisopropylamino, di-n-butylamino, etc.), aromatically mono- or di-substituted amino (e.g. phenylamino, diphenylamino, chlorophenylamino, bromophenylamino, methylphenylamino, dimethylphenylamino, phenylethylamino, etc.) or heterocyclic amino (e.g. pyridyl, etc.), —COR is substituted acyl (e.g. halo(lower)-alkylcarbonyl, dihalo-lower alkylcarbonyl, lower alkanoylamino(lower) alkylcarbonyl, lower alkanoyl(lower) alkylthio(lower)alkyleneamino(lower)alkylcarbonyl, lower alkenyl(lower)alkenylcarbonyl, nitrophenylcarbonyl, dinitrophenylcarbonyl, halophenylcarbonyl, dihalo-phenylcarbonyl such as, inter alia, acetylglycyl, bromoacetyl, chloropropionyl, nitrobenzoyl, dinitrobenzoyl, sorbyl, acetylmethionyl, chlorobenzoyl, dichlorobenzoyl, iodobenzoyl, fluoroacetyl, dichloroacetyl, chloroacetyl) and —COR can be unsubstituted acyl when X is substituted amino.

Compounds I are synthesized from coresponding mitosane compounds of the formula:

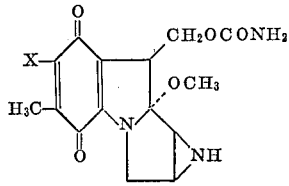

wherein X has the same significances as in Formula I. When X is —OCH₃, the starting compound is mitomycin A and when X is —NH₂, the compound is a derivative of mitomycin C.

According to the present invention, the compounds I are produced by acylation of the starting mitosane compound, the acylation being carried out by reaction with an organic acid in the presence of a dehydrating condensing agent of the formula:

$$R-N=C=N-R$$

wherein R stands for an aliphatic or aromatic hydrocarbon radical, examples being dicyclohexylcarbodiimide and ditolylcarbodiimide, and the reaction being advantageously effected in a solvent for the starting mitosane compound.

The acylation is achieved by dissolving equimolar amounts of starting compound, organic acid and carbodiimide in a solvent therefor and allowing the resultant solution to stand. As the ensuing reaction progresses, the carbodiimide is converted to N,N'-dihexylurea and is precipitated:

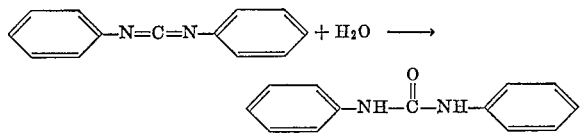

In some cases, the reaction is completed in as short a time as 10 minutes, while in other cases 4 to 5 days may be required for completion of the reaction. The organic acid employed is an aliphatic or aromatic carboxylic acid corresponding to the acyl group which is to be introduced into the starting compound and a wide variety of such acids, including also aminoacids, oxyacids, halogenated carboxylic acids, etc., may be employed.

The following examples set forth presently preferred illustrative, but not limitative, embodiments of the present aspect of the case.

Example 1.—1a-N-acetylglycylmitomycin C 2 g. (grams) of mitomycin C is dissolved in 120 ml. (milliliters) of dioxane, after which 80 mg. (milligrams) of N-acetylglycine in 20 ml. of water is added. 5 g. of dicyclohexylcarbodiimide is then added to the mixture, which is then allowed to stand for 24 hours. The reaction mixture is filtered and the filtrate is concentrated in vacuo at low temperature. The concentrate is extracted with ether in order to exclude unreacted dicyclohexylcarbodiimide. The ether-insoluble part is dissolved in a mixture of acetone and ethyl acetate (1:1) and then chromatographed using silica-gel. From the second fraction, 1a-N-acetylglycylmitomycin C is obtained. Yield 800 mg.

Analysis.—Calcd. for $C_{19}H_{23}O_7N_5$: C, 52.65; H, 5.35; N, 16.16. Found: C, 52.65; H, 5.35.

The infra-red spectrum in Nujol is shown in FIG. 1.

Example 2.—1a-bromacetylmitomycin C 1 g. of mitomycin C is dissolved in 60 ml. of anhydrous tetrahydrofuran. 455 mg. of bromacetic acid and 630 mg. of dicyclohexylcarbodiimide are added to the solution which is then allowed to stand for 1 hour. The reaction mixture is filtered and the filtrate is concentrated under reduced pressure at low temperature. Silica-gel chromatography is carried out using a mixture of acetone and ethyl acetate (3:7) as solvent. The purple first fraction is concentrated under reduced pressure, and the concentrate is dissolved in acetone and then ether added to effect precipitation of the objective 1a-bromacetylmitomycin C. Yield 950 mg.

Analysis.—Calcd. for $C_{17}H_{19}N_4O_6Br$: C, 44.88; H, 4.18; N, 12.54. Found: C, 44.70; H, 4.10.

Figure 2:
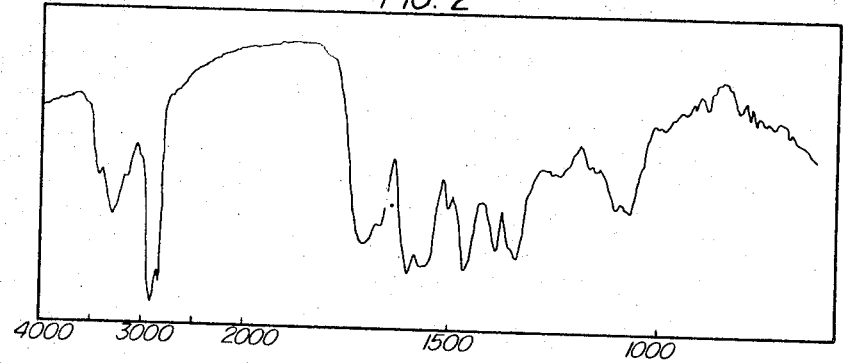

The infra-red spectrum in Nujol is shown in FIG. 2.

Example 3.—1a-α-chloropropionylmitomycin C 1 g. of mitomycin C is dissolved in 60 ml. of anhydrous dioxane. 330 mg. of α-chloropropionic acid in 20 ml. of dioxane and 630 mg. of dicyclohexylcarbodiimide are then added with stirring. The reaction is completed in 20 minutes. The reaction mixture is filtered and concentrated under reduced pressure at low temperature. Silica-gel chromatography is conducted using ethyl acetate-benzene (1:1) as solvent. The main purple fraction is concentrated in vacuo, yielding the objective 1a-α-chloropropionylmitomycin C. Yield 1.1 g.

Analysis.—Calcd. for $C_{18}H_{21}O_6N_4Cl$: C, 50.10; H, 5.10; N, 13.21. Found: C, 50.10; H, 5.01.

Figure 3:
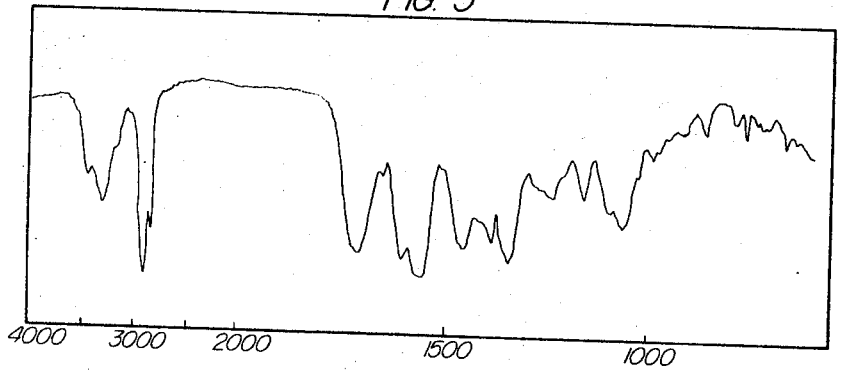

The infra-red spectrum in Nujol is shown in FIG. 3.

Example 4.—1a-para-nitrobenzoylmitomycin C 1 g. of mitomycin C is dissolved in 80 ml. of acetone and, after addition of 520 mg. of p-nitrobenzoic acid and 650 mg. of dicyclohexylcarbodiimide, allowed to stand for 30 minutes at room temperature with stirring. The reaction mixture is filtered and concentrated under reduced pressure. Silica-gel column chromatography is conducted using ethyl acetate as solvent. The first fraction is concentrated and 1a-p-nitrobenzoylmitomycin C is obtained. Yield 1.3 g.

Analysis.—Calcd. for $C_{22}H_{21}O_5N_8$: C, 54.66; H, 4.38; N, 14.49. Found: C, 54.31; H, 4.69; N, 13.87.

Figure 4:
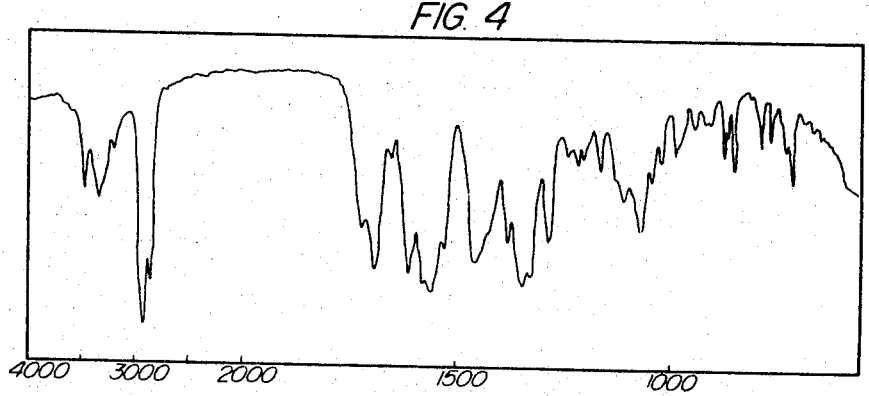

The infra-red spectrum in Nujol is shown in FIG. 4.

Example 5.—1a-3.5-dinitrobenzoylmitomycin C 1 g. mitomycin C is dissolved in 100 ml. of acetone, after which 560 mg. of 3,5-dinitrobenzoic acid in 5 ml. of acetone and 700 mg. of dicyclohexylcardbodiimide in 5 ml. of acetone are stirred in. The reaction continues for 5 minutes. The resultant dicyclohexylurea is removed by filtering the reaction mixture. The filtrate is concentrated under reduced pressure at low temperature. The concentration is conducted until the volume becomes ⅓ of the initial volume. The resulting crystals of 1a-3,5-dinitrobenzoylmitomycin C are separated by filtration and washed 3 to 4 times with ether. Yield 1.4 g.

Analysis.—Calcd. for $C_{22}H_{21}O_7N_5$: C, 50.00; H, 3.82; N, 15.91. Found: C, 50.11; H, 3.61; N, 15.41.

Figure 5:
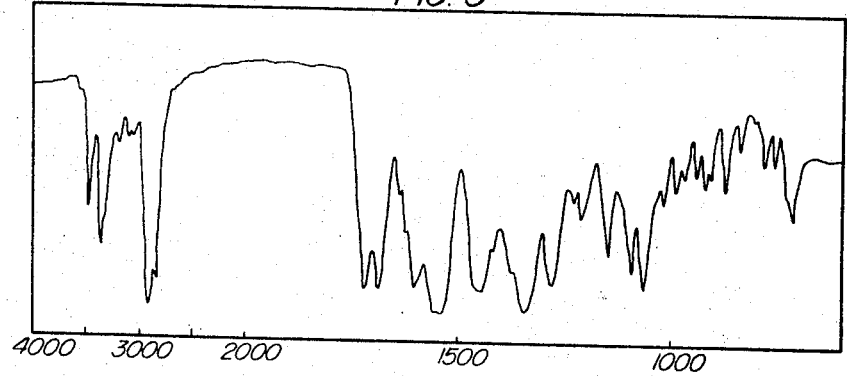

The infra-red spectrum in Nujol is shown in FIG. 5.

Example 6.—1a-sorbylmitomycin C 1 g. of mitomycin C is dissolved in 100 ml. of tetrahydrofuran and, after addition of 700 mg. of dicyclohexylcarbodiimide and 600 mg. of sorbic acid, allowed to stand for 3 days at room temperature with stirring. The reaction mixture is filtered. The filtrate is concentrated under reduced pressure at low temperature. Silicagel column chromatography is conducted using ethyl acetate as solvent in order to remove unreacted material. Ethyl acetate solution of the resulting material is washed 3 times with 5% $NaHCO_3$ and dried with $Na_2SO_4$, and then is concentrated. The chromatography is repeated. The purple fraction is concentrated to give 1a-sorbylmitomycin C. Yield 400 mg.

*Analysis.*—Calcd. for $C_{21}H_{25}N_4O_6$: C, 57.18; H, 5.50; N. 13.61. Found: C, 56.81; H, 5.63; N, 12.93.

Figure 6:
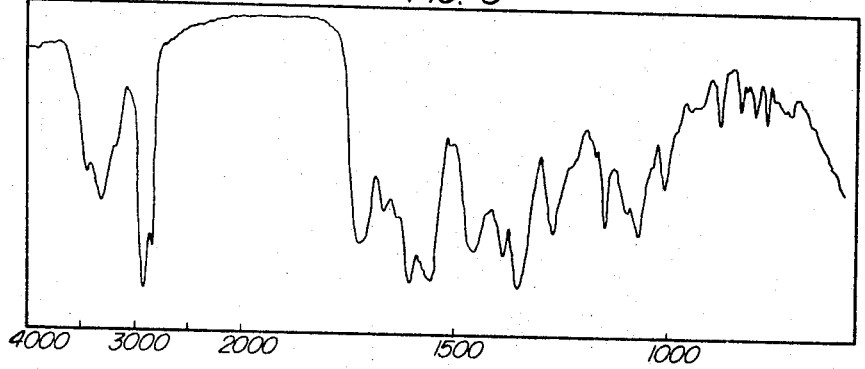

The infra-red spectrum in Nujol is shown in FIG. 6.

Example 7.—1a-acetylmethionylmitomycin C 1 g. of mitomycin C is dissolved in 80 ml. of tetrahydrofuran, after which there are added 700 mg. of dicyclohexylcarbodiimide in a small amount of tetrahydrofuran and 1.3 g of N-acetylmethionine in a small amount of methanol with stirring. The reaction mixture is allowed to stand for a night and the resulting dicyclohexylurea is removed. The filtrate is concentrated under reduced pressure at low temperature. Silica-gel chromatography is conducted using ethyl acetate as solvent. The purple first fraction is concentrated under reduced pressure to give the objective product, 1a-acetylmethionylmitomycin C. Yield 250 mg.

*Analysis.*—Calcd. for $C_{23}H_{29}N_5O_7$: C, 52.40; H, 5.50; N, 13.88. Found: C, 52.12; H, 5.81; N, 13.24.

Figure 7:
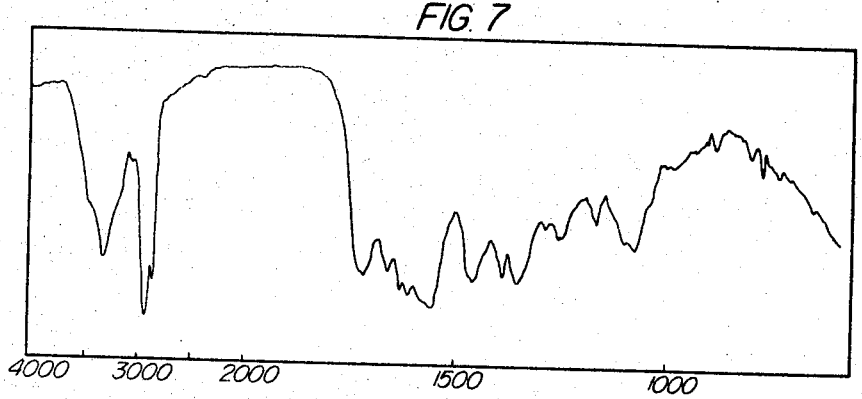

The infra-red spectrum in Nujol is shown in FIG. 7.

Example 8.—1a-benzoyl-7a-ethylmitomycin C 30 mg. of 7a-ethylmitomycin C is dissolved in 10 ml. of acetone and, after the addition of 10 mg. of benzoic acid and 25 mg. of dicyclohexylcarbodiimide, allowed to stand for a night. The reaction mixture is filtered and concentrated under reduced pressure at low temperature. Silica-gel chromatography is conducted using ethyl acetate as solvent. The first fraction is concentrated to give the desired product, 1a-benzoyl-7a-ethylmitomycin C. Yield 25 mg.

*Analysis.*—Calcd. for $C_{24}H_{26}O_6N_4$: C, 62.09; H, 5.69; N, 11.65. Found: C, 61.41; H, 5.81; N, 11.03.

Figure 8:
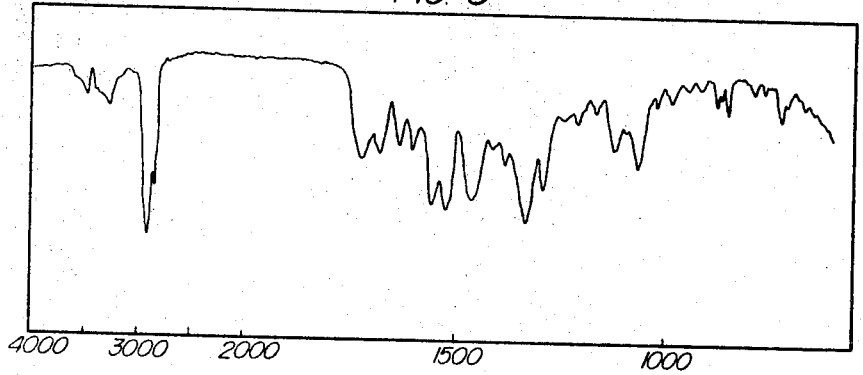

The infra-red spectrum in Nujol is shown in FIG. 8.

Example 9.—1a-p-nitrobenzoylmitomycin A 100 mg. of mitomycin A is dissolved in 10 ml. of acetone, followed by addition of 70 mg. of dicyclohexylcarbodiimide and 60 mg. of p-nitrobenzoic acid. The reaction is continued for 10 minutes. The reaction mixture is filtered and concentrated under reduced pressure at low temperature. Ether is added to the concentrate to effect precipitation. The ether is removed by decantation, and the precipitate is dissolved in small amount of ethyl acetate. Silica-gel chromatography is conducted using a mixture of ethyl acetate and benzene (1:1). The reddish first fraction is dried in vacuo at low temperature, to yield 1a-p-nitrobenzoylmitomycin A. Yield 110 mg.

*Analysis.*—Calcd. for $C_{23}H_{22}O_9N_4$: C, 56.65; H, 4.43; N, 10.88. Found: C, 56.43; H, 4.41; N, 10.33.

Figure 17:
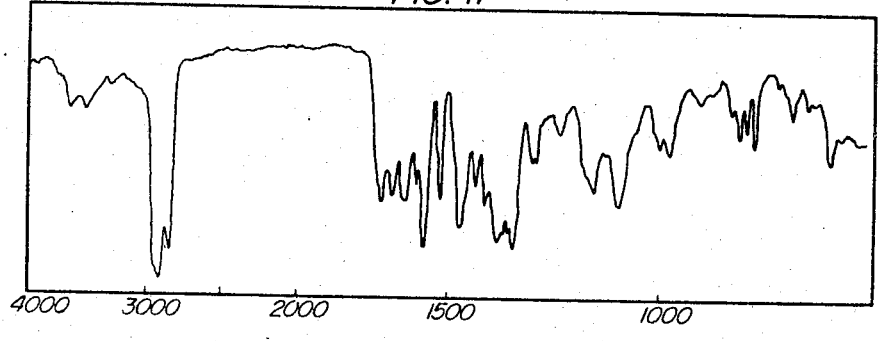

The infra-red spectrum in Nujol is shown in FIG. 17.

Example 10

Figure 9:
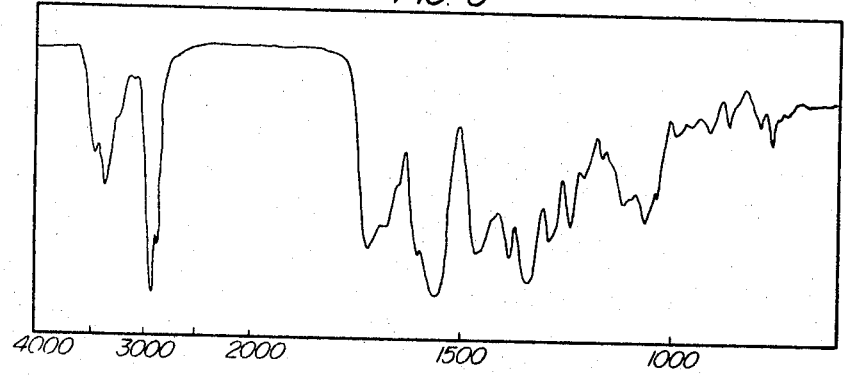
Figure 10:
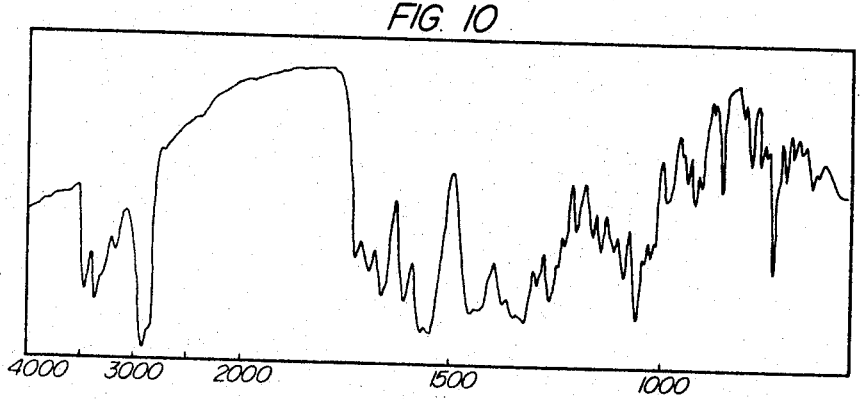
Figure 11:
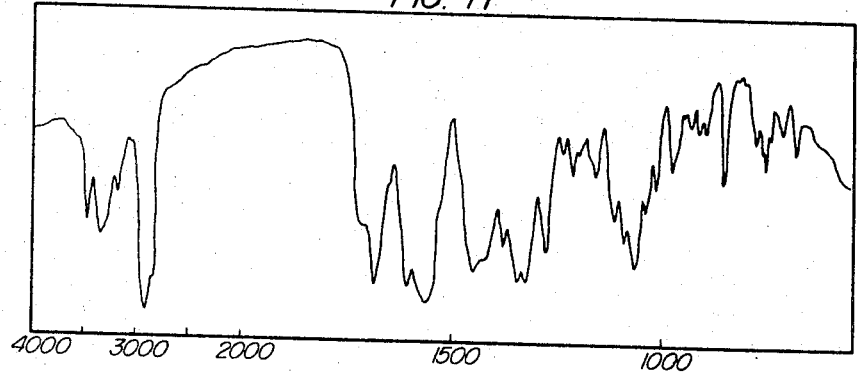
Figure 12:
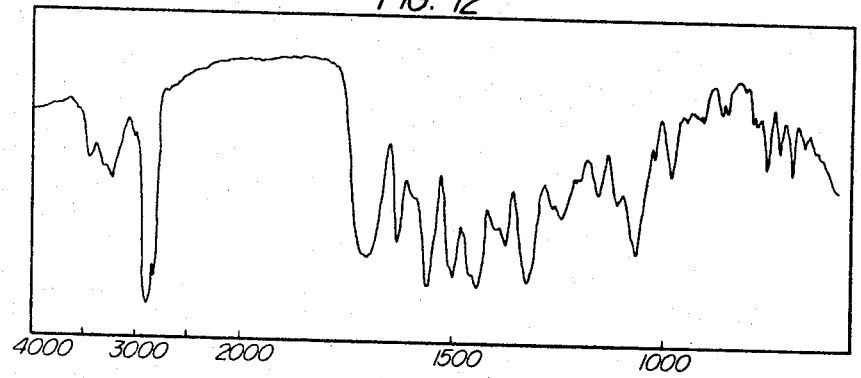
Figure 13:
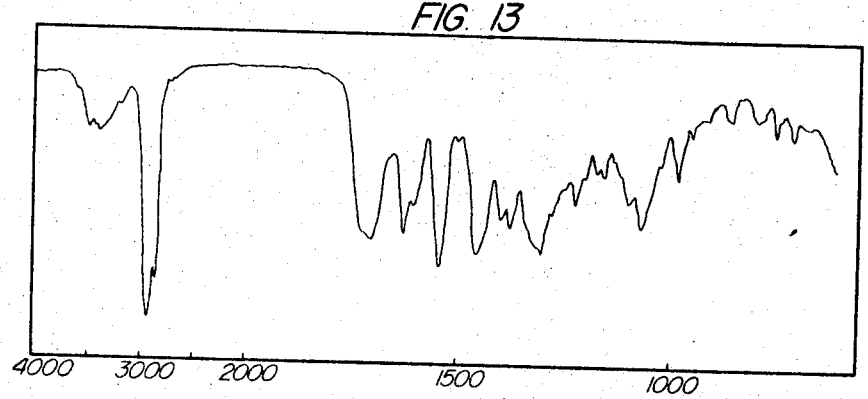
Figure 14:
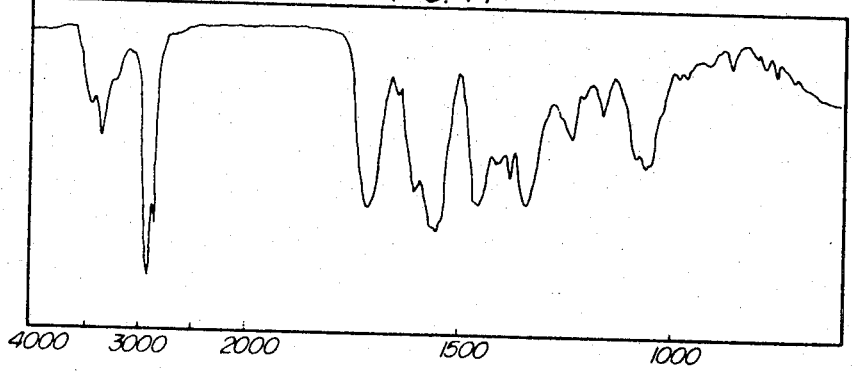
Figure 15:
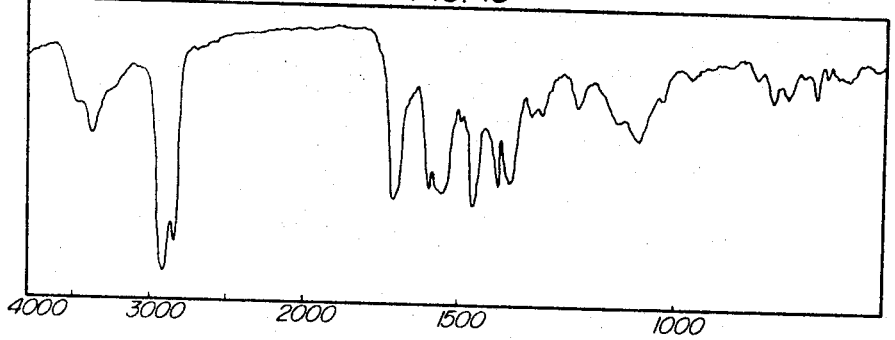
Figure 16:
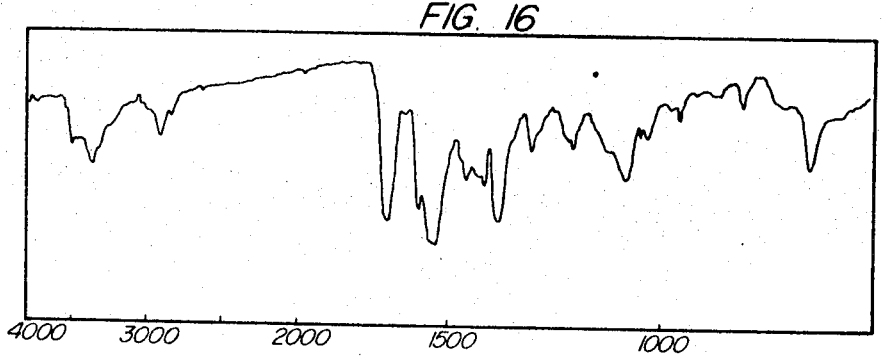

The following derivatives are produced:

| Name of derivative | Molecular formula | Reacting materials | Reaction time | Yield (from 1 g. of Mitomycin C) | Infra-red spectrum |
|---|---|---|---|---|---|
| 1a-3,4-dichloro benzoylmitomycin C | $C_{22}H_{20}N_4O_6Cl_2$ | Mitomycin C, 3,4-dichlorobenzoic acid | 2 hours | 1.3 g | Fig. 9. |
| 1a-o-iodobenzoyl-mitomycin C | $C_{22}H_{21}N_4O_6I$ | Mitomycin C, o-iodo-benzoic acid | 3 hours | 1.0 g | Fig. 10. |
| 1a-p-chlorobenzoyl-mitomycin C | $C_{22}H_{21}N_4O_6Cl$ | Mitomycin C p-chlorobenzoic acid | do | 1.15 g | Fig. 11. |
| 1a-fluoroacetyl-mitomycin C | $C_{17}H_{19}N_4O_6F$ | Mitomycin C, fluoroacetic acid | 30 minutes | 0.65 g | Fig. 14. |
| 1a-trichloroacetyl-mitomycin C | $C_{17}H_{17}N_4O_6Cl_3$ | Mitomycin C, trichloroacetic acid | 20 minutes | 1.20 g | Fig. 15. |
| 1a-dichloroacetyl-mitomycin C | $C_{17}H_{18}N_4O_6Cl_2$ | Mitomycin C, dichloroacetic acid | 15 minutes | 1.20 g | Fig. 16. |
| 1a-α-chloropropionyl-7N-phenyl-mitomycin C. | $C_{24}H_{25}N_4O_6Cl$ | 7N-phenyl-mitomycin C, α-chloropropionic acid | 30 minutes | 800 mg | Fig. 12. |
| 1a-acetyl-7N-pridyl-mitomycin C | $C_{22}H_{23}N_4O_6$ | 7N-pyridyl-mitomycin C, acetic acid | 20 minutes | 850 mg | Fig. 13. |

The new compounds I are less toxic than mitomycin C as is shown in the following:

TABLE 1

| Derivatives | $LD_{50}$ mg./kg. mouse |
|---|---|
| Mitomycin C | 9 |
| 1a-acetylglycylmitomycin C | 18.75 |
| 1a-bromacetylmitomycin C | 75.0 |
| 1a-chloroacetylmitomycin C | 30.0 |
| 1a-β-chloropropionylmitomycin C | 75.0 |
| 1a-α-chloropropionylmitomycin C | 33.75 |
| 1a-p-nitrobenzoylmitomycin C | 55.0 |
| 1a-3,4-dichlorobenzoylmitomycin C | 22.5 |
| 1a-p-chlorobenzoylmitomycin C | 18.75 |
| 1a-benzoyl-7a-ethylmitomycin C | 40.0 |
| 1a-o-iodobenzoylmitomycin C | 150.0 |
| 1a-sorbylmitomycin C | 75.0 |

Table 2 shows exemplary minimum inhibition concentrations of derivatives of the present invention against various test microorganisms.

TABLE 2
(Minimum inhibition concentration)

| | 1a-acetylglycyl-mitomycin C | 1a-bromacetyl-mitomycin C | 1a-β-chloropropionyl-mitomycin C | 1a-α-chloropropionyl-mitomycin C | 1a-benzoyl-7a-ethyl-mitomycin C |
|---|---|---|---|---|---|
| *Staphylococcus aureus* 209 P | 0.39 | 0.39 | 0.195 | 0.195 | 3.12 |
| *Sarcina lutea* PCI 1001 | 0.195 | 0.39 | 0.195 | 0.195 | 6.25 |
| *Bacillus subtilis* ATCC 6633 | 0.195 | 0.39 | 0.097 | 0.195 | 3.12 |
| *Salmonella typhi* 379 | 1.56 | 3.12 | 1.56 | 1.56 | 25 |
| *Shigella flexneri* Za 3196 | 0.195 | 3.12 | 0.78 | 1.56 | 0.195 |
| *Klebsiella pneumoniae* 0/10 | 0.78 | 3.12 | 1.56 | 1.56 | 50 |
| *Proteus* X19 | 3.12 | 6.25 | 1.56 | 3.12 | 50 |
| *Escherichia coli* K–12 | 1.56 | 6.25 | 3.12 | 3.12 | 25 |
| *Pseudomonas aeruginosa* 35 | 3.12 | 6.25 | 1.56 | 3.12 | 50 |
| *Vibrio comma* 62 | 0.097 | 0.024 | <0.012 | 0.024 | 50 |
| *Mycobacterium tuberculosis* 607 | 0.39 | 0.048 | 0.048 | 0.048 | 0.78 |
| *Streptococcus haemolyticus* 68 | 0.195 | 0.097 | 0.048 | 0.048 | 0.195 |
| *Streptococcus faecalis* 5 | 0.39 | 0.39 | 0.78 | 0.39 | 6.25 |
| *Diplococcus pneumoniae* 1–19 | 0.024 | 0.024 | <0.012 | 0.012 | 3.12 |
| *Corynebacterium diphtheriae* 92 | 0.097 | 0.048 | 0.048 | 0.048 | 0.195 |

What is claimed is:
1. 1a-N-acetylglycylmitomycin C.
2. 1a-p-nitrobenzoylmitomycin A.
3. 1a-3,5-dinitrobenzoylmitomycin C.
4. 1a-sorbylmitomycin C.
5. 1a-acetylmethionylmitomycin C.
6. 1a-p-nitrobenzoylmitomycin C.
7. 1a-α-chloropropionyl-7-N-phenylmitomycin C.
8. 1a-acetyl-7-N-pyridylmitomycin C.

References Cited

UNITED STATES PATENTS

| | | | |
|---|---|---|---|
| 3,226,393 | 12/1965 | Meyer et al. | 260—295 |
| 3,332,944 | 7/1967 | Cosulich et al. | 260—247.2 |
| 2,583,425 | 1/1952 | Hawley | 167—30 |

OTHER REFERENCES

Berger, Medicinal Chemistry, Interscience, second ed. (1960) p. 43.

HENRY R. JILES, *Primary Examiner.*

ALAN L. ROTMAN, *Assistant Examiner.*

U.S. Cl. X.R.

260—326.3, 999